United States Patent
Kim

(10) Patent No.: US 11,985,970 B2
(45) Date of Patent: May 21, 2024

(54) ECO-FRIENDLY HERBICIDES CONTAINING PELARGONIC ACID FOR FOLIAR FERTILZATION AND FOR BACTERICIDAL AND HARMFUL BIRD AND ANIMAL REPELLENT FUNCTIONS

(71) Applicant: Green Solution LLC, Pearce, AZ (US)

(72) Inventor: Kwang Hwan Kim, Goyang-si (KR)

(73) Assignee: Green Solution LLC, Pearce, AZ (US)

( * ) Notice: Subject to any disclaimer, the term of this patent is extended or adjusted under 35 U.S.C. 154(b) by 0 days.

(21) Appl. No.: 18/210,693

(22) Filed: Jun. 16, 2023

(65) Prior Publication Data

US 2024/0107996 A1    Apr. 4, 2024

(30) Foreign Application Priority Data

Jun. 22, 2022  (KR) ......................... 10-2022-0076095

(51) Int. Cl.
- A01N 25/04  (2006.01)
- A01N 37/02  (2006.01)
- A01P 13/02  (2006.01)

(52) U.S. Cl.
CPC ............. A01N 25/04 (2013.01); A01N 37/02 (2013.01); A01P 13/02 (2021.08)

(58) Field of Classification Search
CPC .......... A01N 25/04; A01N 37/02; A01P 13/02
See application file for complete search history.

(56) References Cited

U.S. PATENT DOCUMENTS

2017/0006859 A1*  1/2017  Raman ................... A01N 25/30

FOREIGN PATENT DOCUMENTS

| CN | 108289455 A | * | 7/2018 | ............. A01N 25/00 |
|---|---|---|---|---|
| CN | 108576046 A | | 9/2018 | |
| CN | 111406748 A | * | 7/2020 | ............. A01G 13/00 |
| CN | 111406748 A | | 7/2020 | |
| JP | 2003-080064 A | | 3/2003 | |
| JP | 2004-524263 A | | 8/2004 | |
| JP | 2012-058542 A | | 3/2012 | |
| JP | 2018-513133 A | | 5/2018 | |
| KR | 10-0546890 B1 | | 1/2006 | |
| KR | 10-2017-0057932 A | | 5/2017 | |
| KR | 20170057932 A | * | 5/2017 | ............. A01N 37/00 |
| KR | 10-2126136 B1 | | 6/2020 | |

OTHER PUBLICATIONS

Goyal, 2-Octyl Cyanoacrylate (Dermabond) Wound Adhesives, Jun. 11, 2021, pp. 1-9. (Year: 2021).*

* cited by examiner

Primary Examiner — Benjamin J Packard
Assistant Examiner — Joshua A Atkinson
(74) Attorney, Agent, or Firm — Revolution IP, PLLC

(57) ABSTRACT

The present invention relates to an eco-friendly herbicide comprising 8 to 15% by weight of soft water, 1.5 to 5% by weight of canola oil, 0.2 to 1% by weight of potassium hydroxide, 78 to 88% by weight of pelargonic acid, 0.2 to 1% by weight of sodium alginate, 0.2 to 1% by weight of citric acid and 0.1 to 1% by weight of beet juice, and the herbicide provides the effects of being harmless to the human body and not causing soil contamination while exhibiting not only weed control but also bactericidal, insecticidal and harmful bird and animal repellent functions.

1 Claim, 2 Drawing Sheets

[Figure 1]
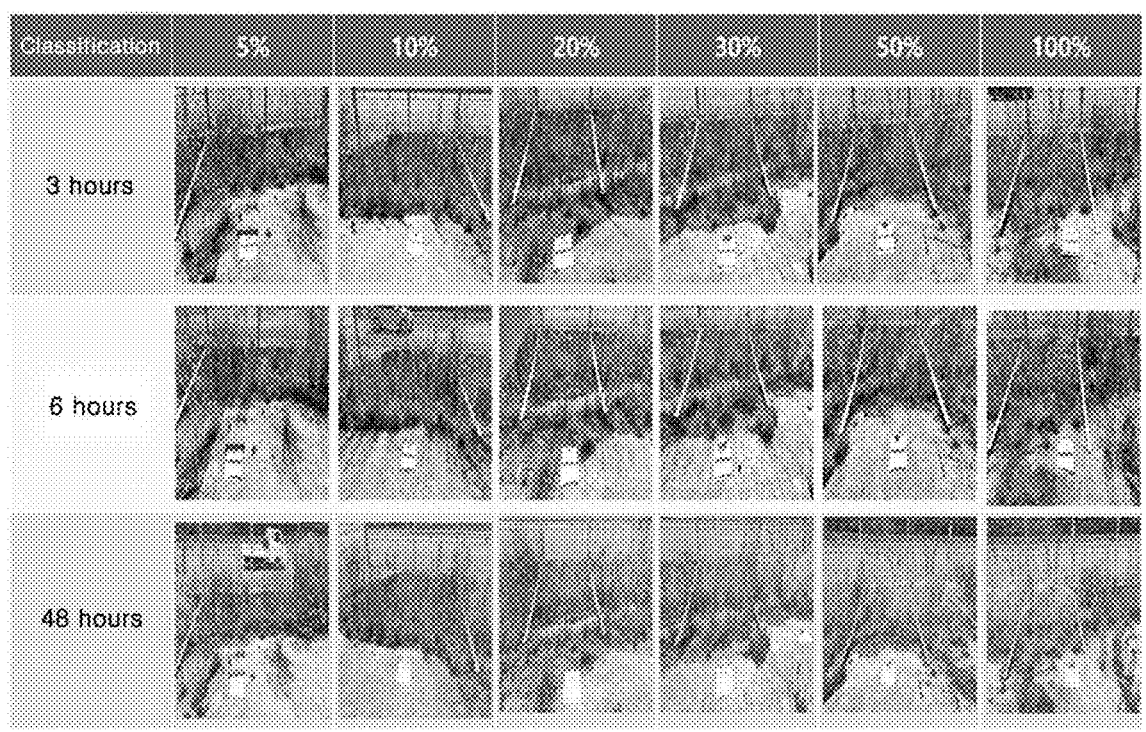

【Figure 2】

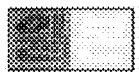

Cheil Analysis Center
http://www.cheillab.com

Test Report

| Client | Name/Company Name | Grae Korea Co., Ltd. | Company Registration Number | 128-86-88313 |
|---|---|---|---|---|
| | Address | E-108, Environmental Industry Research Complex, 410, Jeongseohe-ro, Seo-gu, Incheon 22689, Korea | | |
| Test Item | Herbicide (Specific urea complex fertilizer-SSAKSSRI/PULSSAKSSRI) | | | |
| Receipt Date | Feb. 8, 2022 | Test Date | Feb. 9, 2022 | |
| Receipt No. | 22-02-GE0084 | Test Purpose | For reference | |

Test Results

| Test Item | Detection Component | Acceptable Criteria (mg/kg) | Result (mg/kg) | Review Comments |
|---|---|---|---|---|
| 464 pesticide residues | - | - | - | All 464 pesticide residues were not detected |

Attachment: Test Items (1 paper)
Test Director: Sang-Hun HAN          Tester: Woo-Gil JANG Note) The test result above is the analysis result of the sample provided to our firm by the client February 10, 2022

Cheil Analysis Center Representative Eun-Mi LEE          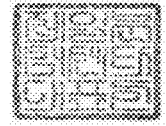

Please note that the results of this test cannot be used for purposes other than the purpose of request, such as advertisement and suit, and that the responsibility for them is irrelevant to our firm.

ECO-FRIENDLY HERBICIDES CONTAINING PELARGONIC ACID FOR FOLIAR FERTILZATION AND FOR BACTERICIDAL AND HARMFUL BIRD AND ANIMAL REPELLENT FUNCTIONS

TECHNICAL FIELD

The present invention relates to an eco-friendly herbicide, and more specifically, to an eco-friendly herbicide that has not only weed control as a herbicide for foliar fertilization but also bactericidal and harmful bird and animal repellent functions, is low in odor, is harmless to the human body and livestock, and does not cause soil contamination.

BACKGROUND ART

Weeds are a great obstacle to crop cultivation, such as depriving crops of nutrients, water, light and space to be used by the crops, thereby not only inhibiting growth and reducing fruit yield, but also reducing the labor efficiency and encouraging the occurrence of diseases and insect pests.

The herbs used to control these weeds are called herbicides. Weed management in farmland should be done by appropriate systematization and integration (integrated weed management and integrated pest management (IPM)) of chemical (herbicide), agronomical, ecological, biological, physical and mechanical methods, but the use of herbicides is the most efficient and effective.

Herbicides also play a large role in weed management of slope faces of roads or railways, airports, river embankments, factory sites, housing sites, parks, stadiums, golf courses, and the like, in addition to farmland. As a herbicide, PCP, developed as a bactericide in 1936, was recognized to have strong weed control activity and was used for weed control, but the full-scale development of synthetic organic herbicides can be said after the development of 2,4-D (1942).

From the 1950s to the 1970s, many types of herbicides were put into practical use, forming the heyday of organic synthetic herbicides. However, the persistence of herbicide ingredients in the soil caused a social problem, and thus, since the 1970s, efforts have been made to develop safe herbicides that are low in toxicity and have no impact on the ecosystem.

Recently, as living standards have improved and interest in health has increased, there has been a demand for safe agricultural products, and eco-friendly agriculture that can continuously produce agricultural products while earning appropriate income without polluting the environment is actively practiced.

Accordingly, there is a demand for the development of an eco-friendly herbicide that is harmless to the human body and do not pollute the soil while exhibiting excellent weed control performance.

PRIOR ART DOCUMENTS

Patent Documents (Patent Document 1) Korean Patent No. 10-0546890
(Patent Document 2) Korean Patent No. 10-2126136

DESCRIPTION

Problem to be Solved

The present invention has been devised to solve the problem that existing herbicides run off due to dew condensation on weeds when sprayed, resulting in no weed control, and it is an object of the present invention to provide an eco-friendly herbicide that improves the weed control function of herbicides by having excellent spreading force, prevents the occurrence of voids in the soil by killing only the leaves and not the roots of weeds, and functions to prevent soil or slope collapse by cohering soil particles.

It is another object of the present invention to provide an eco-friendly herbicide that has not only excellent weed control function but also bactericidal and harmful bird and animal repellent functions, is harmless to the human body and livestock, and does not cause environmental pollution to soil and water quality.

Technical Solution

The present invention provides an eco-friendly herbicide comprising 8 to 15% by weight of soft water, 1.5 to 5% by weight of canola oil, 0.2 to 1% by weight of potassium hydroxide, 78 to 88% by weight of pelargonic acid, 0.2 to 1% by weight of sodium alginate, 0.2 to 1% by weight of citric acid, and 0.1 to 1% by weight of beet juice.

In addition, the present invention provides a method for preparing an eco-friendly herbicide, comprising the steps of:
a) mixing and stirring 0.3 to 1 part by weight of soft water, 1.5 to 5 parts by weight of canola oil, and 0.2 to 1 part by weight of potassium hydroxide;
b) leaving the mixed and stirred composition in step a) for 48 to 96 hours, and then further adding 7.7 to 14 parts by weight of soft water, and aging it at room temperature for 10 to 20 days; and
c) mixing 0.2 to 1 part by weight of sodium alginate, 0.2 to 1 part by weight of citric acid and 0.1 to 1 part by weight of beet juice with 78 to 88 parts by weight of the aged composition.

Advantageous Effect

The eco-friendly herbicide of the present invention provides the effects of providing excellent weed control function by strengthening the spreading force, preventing the occurrence of voids in the soil by killing only the leaves and not the roots of weeds, providing a function to prevent soil or slope collapse by cohering soil particles, providing bactericidal and harmful bird and animal repellents functions, being harmless to the human body and livestock, and not causing environmental pollution to soil and water quality.

In addition, the eco-friendly herbicide of the present invention provides the effects of preventing civil complaints and reducing labor costs, by reducing the number of weed control works by strong weed control power, thereby solving the problems of increased noise and labor costs caused by repetitive weed control work.

BRIEF DESCRIPTION OF THE DRAWINGS

FIG. 1 is a photograph showing the performance test results of the eco-friendly herbicide of the present invention.

FIG. 2 shows the pesticide residue detection test report of the eco-friendly water-soluble adhesive enhancer according to the present invention.

DETAILED DESCRIPTION

Hereinafter, the present invention will be described in detail.

The present invention provides an eco-friendly herbicide comprising 8 to 15% by weight of soft water, 1.5 to 5% by weight of canola oil, 0.2 to 1% by weight of potassium hydroxide, 78 to 88% by weight of pelargonic acid, 0.2 to 1% by weight of sodium alginate, 0.2 to 1% by weight of citric acid, and 0.1 to 1% by weight of beet juice.

The eco-friendly herbicide of the present invention has the characteristics of providing excellent weed control function by having excellent spreading force, preventing the occurrence of voids in the soil by killing only the leaves and not the roots of weeds, functioning to prevent soil or slope collapse by cohering soil particles, having bactericidal and harmful bird and animal repellents functions, being harmless to the human body and livestock, and not causing environmental pollution to soil.

Hereinafter, the characteristics of the ingredients of the present invention will be described.

The soft water refers to water having a low content of calcium ions or magnesium ions, and functions to promote mixing of various substances.

The canola oil is a raw material of potassium soap and is made by reacting with sodium hydroxide through a saponification process. The process by which potassium hydroxide reacts with oil and water to produce potassium soap is called the saponification process, and the resulting potassium soap is particularly effective against frequent pests such as aphids, locusts and whiteflies, and is also very effective against mold. The potassium soap also has an effect on improving plant health because it is made from natural products unlike artificial products made to prevent pests.

The potassium hydroxide is also called caustic potash and is a strong alkali like sodium hydroxide, and both its properties and color are similar to sodium hydroxide. It is a colorless translucent solid, is insoluble in ethanol and methanol, and is an orthorhombic crystal system at room temperature. The potassium hydroxide has almost the same chemical properties as sodium hydroxide, but its corrosiveness and ability to absorb carbon dioxide are stronger than sodium hydroxide.

The pelargonic acid is a chemical found in almost all species of plants and animals, is also called nonanoic acid because it contains 9 carbon atoms, and is also found at low levels in many common foods we eat.

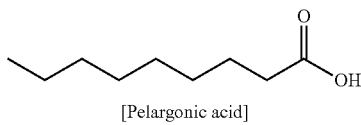

[Pelargonic acid]

Pelargonic acid is readily degraded in the environment and has two distinct uses, especially with respect to plants: as a herbicide and as a flower diluent. Pelargonic acid as a herbicide serves to protect crops from weeds and may be applied from the time of sowing until 24 hours before harvest. If pelargonic acid is used as a flower diluent, it serves to increase the quality and yield of fruit trees. Pelargonic acid has a risk assessment to human health, but it occurs naturally in many plants, including edible plants, and thus, it is regularly exposed to most people in small amounts in food or the natural environment, and also pelargonic acid has been approved as a food additive by the US Food and Drug Administration (FDA) and is commercially used as an ingredient in solutions used to peel fruits and vegetables. This approval indicates that the US Food and Drug Administration (FDA) considers the use of small amounts of pelargonic acid to be safe.

The sodium alginate is a substance in which alginic acid and sodium are combined, and alginic acid is a fibrous ingredient that accounts for 20 to 30% of seaweed such as sea mustard or kelp, and has a soft and slippery property when put in water. Alginic acid itself is insoluble in water, but when combined with sodium, it is not only soluble in water, but also becomes a highly viscous solution. These properties of sodium alginate serve to solve the problem that existing herbicides run off due to dew condensation on weeds when sprayed, resulting in no weed control.

The citric acid is a white powder without odor and is a natural substance obtained by fermenting molasses. It has an excellent bacteriostatic effect of reducing the propagation of invisible living germs and microorganisms. The bacteriostatic action of citric acid reduces the number of bacteria, unlike "bactericidal action," which removes bacteria, but high-concentration citric acid shows the same action as herbicides, and vinegar and citric acid exerts a better weed control effect on plants when used in combination than when used alone. The eco-friendly herbicide of the present invention may further comprise 0.2 to 1% by weight of citric acid. The red beet juice contains an ingredient called alkaloid, and this ingredient provides an excellent effect on weed control.

The eco-friendly herbicide of the present invention may further comprise 0.01 to 3% by weight of Texanol ((3-hydroxy-2,2,4-trimethylpentyl)-2-methylpropanoate). The Texanol is a biodegradable and VOC-free eco-friendly ingredient, and serves to prevent re-scattering of dust by forming a bond between the herbicide and the leaf, stem, and the like of a plant. Specifically, the Texanol provides adhesion to the herbicide to exert a weed control effect continuously for a longer period on the surface of the leaf of the plant.

The eco-friendly herbicide of the present invention may further comprise 0.01 to 2% by weight of a copolymer represented by Formula 1 below:

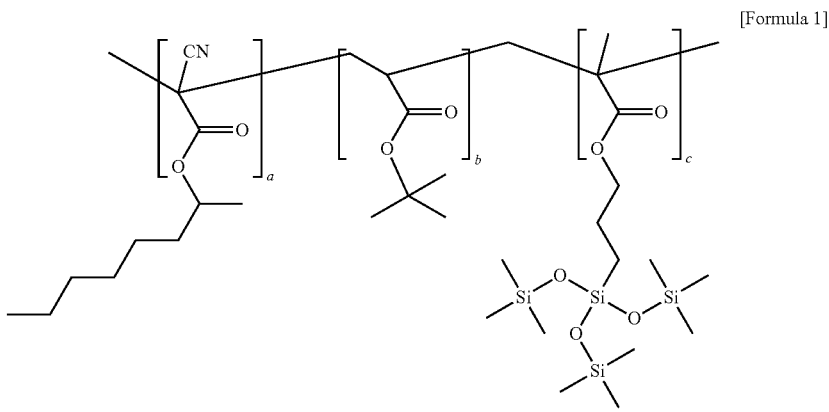

[Formula 1]

wherein, a, b and c represent mole fractions; and
a is 0.1 to 0.4, b is 0.1 to 0.4, c is 0.3 to 0.7, and a+b+c is 1.

The 2-octylcyanoacrylate monomer derived unit included in the copolymer of Formula 1 is an ingredient that provides adhesion between herbicide ingredients and the leaves and stems of weeds. In addition, methacryloxypropyl tris(trimethylsiloxy)silane (CAS No: 17096-07-0) monomer derived unit is a monomer that forms a very good bond with organic and inorganic materials and provides adhesion between herbicide ingredients and the leaves and stems of weeds. In addition, the vinyl alcohol monomer derived unit is also a monomer that provides adhesion between herbicide ingredients and the leaves and stems of weeds.

The copolymer of Formula 1 above allows the ingredients of the eco-friendly herbicide to be well dispersed and provides adhesion between herbicide ingredients and the leaves of weeds.

The copolymer of Formula 1 above is a random copolymer, and may have a weight average molecular weight of 50,000 to 500,000, more preferably 150,000 to 300,000.

The eco-friendly herbicide may further comprise 5 to 20 parts by weight of an emulsifier based on 100 parts by weight of the eco-friendly herbicide.

The emulsifier may include 25 to 40% by weight of polysorbate; 22 to 38% by weight of 1,4-anhydro-D-glucitol 6-dodecanoate; 6 to 15% by weight of docusate sodium; 12 to 26% by weight of poly(oxy-1,2-ethanediyl), alpha-sulfo-omega-hydroxy-, C12-14-alkyl ether, sodium salt; and 3 to 10% by weight of water.

The eco-friendly herbicide may be diluted 2 to 100 times with water as an extender when used.

The water is used as ($H_2O$) and plays a role in adjusting the concentration and physical properties when the active ingredient of the herbicide is used as a powder or a wettable powder.

As shown in Table 1 below, the eco-friendly herbicide of the present invention satisfies all physical properties required for herbicides.

TABLE 1

| Test Items | Unit | Specified value | Performance |
|---|---|---|---|
| Biological oxygen demand (BOD) | mg/L | — | 6.1 |
| Chemical oxygen demand (titrimetric method - acidic potassium permanganate method) | | — | 45.6 |
| Chemical oxygen demand (titrimetric method - potassium dichromate method) | | — | 983.7 |
| Phenols | | — | not detected |
| Cyan(CN–) | | — | not detected |
| Iron (Fe) | | — | not detected |
| Zinc (Zn) | | — | not detected |
| Copper (Cu) | | — | not detected |
| Cadmium (Cd) | | — | not detected |
| Organic phosphorus | | — | not detected |
| Arsenic (As) | | — | not detected |
| Lead (Pb) | | — | not detected |
| Chromium (Cr6+) | | — | not detected |
| Manganese (Mn) | | — | not detected |
| Nickel (Ni) | | — | not detected |
| Benzene | | — | not detected |
| Chloroform | | — | not detected |
| Formaldehyde | | — | not detected |
| Dissolved oxygen (DO) | | — | 9.6 |
| Hydrogen ion concentration (pH) | pH | — | 8.1 |
| Ecotoxicity | TU | — | 1.4 |

In addition, the present invention relates to a method for preparing an eco-friendly herbicide, comprising the steps of:

a) mixing and stirring 0.3 to 1 part by weight of soft water, 1.5 to 5 parts by weight of canola oil, and 0.2 to 1 part by weight of potassium hydroxide;
b) leaving the mixed and stirred composition in step a) for 48 to 96 hours, and then further adding 7.7 to 14 parts by weight of soft water, and aging it at room temperature for 10 to 20 days; and
c) mixing 0.2 to 1 part by weight of sodium alginate, 0.2 to 1 part by weight of citric acid and 0.1 to 1 part by weight of beet juice with 78 to 88 parts by weight of the aged composition.

In step c) above, 0.01 to 3 parts by weight of Texanol ((3-hydroxy-2,2,4-trimethylpentyl)-2-methylpropanoate) may be further added.

In step c) above, 0.01 to 2 parts by weight of the copolymer represented by Formula 1 above may be further added and mixed.

Hereinafter, the present invention will be described in more detail through preparative examples and examples. However, the following examples are intended to further more specifically describe the present invention, and the scope of the present invention is not limited by the examples. The following examples may be appropriately modified and changed by those skilled in the art within the scope of the present invention.

Example 1: Preparation of an Eco-Friendly Herbicide 0.3 parts by weight of soft water, 0.35 parts by weight of potassium hydroxide and 2.5 parts by weight of canola oil were stirred, and then, after 72 hours at room temperature, 12.5 parts by weight of soft water was further added thereto and aged at room temperature for 15 days. Thereafter, 90 parts by weight of pelargonic acid, 0.5 parts by weight of sodium alginate, 0.5 parts by weight of citric acid and 0.2 parts by weight of beet juice were added to the aged composition and mixed to prepare an eco-friendly herbicide.

Example 2: Preparation of an Eco-Friendly Herbicide

An eco-friendly herbicide was prepared with the same constitution as in Example 1 above, except that 1.5 parts by weight of Texanol ((3-hydroxy-2,2,4-trimethylpentyl)-2-methylpropanoate) was further added to the aged composition and mixed.

Example 3: Preparation of an Eco-Friendly Herbicide

An eco-friendly herbicide was prepared with the same constitution as in Example 2 above, except that 1 part by weight of the copolymer of Formula 1 below was further included in the aged composition.

Preparative Example 1: Preparation of a Copolymer of Formula 1

2-Octylcyanoacrylate, methacryloxypropyl tris(trimethylsiloxy)silane (CAS No: 17096-07-0) and vinyl alcohol were added to ethylbenzene as a reaction solvent in a molar ratio of 0.2:0.5:0.3, and 0.5 parts by weight of normal mercaptan was mixed with 100 parts by weight of all monomers and homogenized. The polymerization solution prepared above was polymerized at a temperature of 100° C. while it was introduced into a 20 L reactor at a rate of 10 L/hr, and unreacted monomers and reaction solvents were removed from a volatilization tank at a temperature of 150° C., and washing, dehydration and drying were performed to obtain a copolymer of Formula 1 having a weight average molecular weight of 233,000.

[Formula 1]

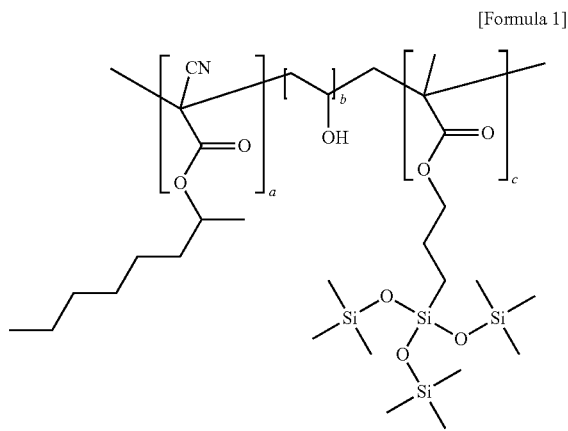

wherein, a, b and c represent mole fractions; and a is 0.2, b is 0.3, and c is 0.5.

Test Example 1: Confirmation of Weed Control Effect

The eco-friendly herbicide prepared in Example 1 above was diluted with water so that the concentration was 5%, 10%, 20%, 30%, 50% and 100%, respectively, and then sprayed on the weed field, and photographs were taken over time, and the photographed picture is shown in FIG. 1.

As confirmed in FIG. 1, the eco-friendly herbicides of the present invention showed a very excellent effect on weed control.

Test Example 2: Pesticide Residue Detection Test

The pesticide residue content test of the eco-friendly herbicide prepared in Example 1 above was requested to an external analysis center, and the test report was received and is shown in FIG. 2.

As shown in FIG. 2, no pesticide residues were detected in the eco-friendly herbicide of the present invention.

Test Example 3: Evaluation of Weed Control Performance

The weed control effect was observed over time while the eco-friendly herbicides of Examples 1 to 3 above were diluted with water at a concentration of 30% and applied to the weed field under the same conditions for 15 days, and the results are shown in Table 2 below.

TABLE 2

| Eco-Friendly Herbicide | Treated Plant | Weed control rate (%) | | |
|---|---|---|---|---|
| | | 7 days later | 10 days later | 15 days later |
| Example 1 preparation | weed | 63% | 74% | 87% |
| Example 2 preparation | weed | 72% | 80% | 92% |
| Example 3 preparation | weed | 76% | 85% | 96% |

As confirmed in Table 2 above, the eco-friendly herbicides of the present invention showed excellent weed control ability in a very short time.

The invention claimed is:
1. An eco-friendly herbicide comprising
    8 to 15% by weight of water,
    1.5 to 5% by weight of canola oil,
    0.2 to 1% by weight of potassium hydroxide,
    78 to 88% by weight of pelargonic acid,
    0.2 to 1% by weight of sodium alginate,
    0.2 to 1% by weight of citric acid,
    0.1 to 1% by weight of beet juice,
    0.01 to 3% by weight of (3-hydroxy-2,2,4-trimethylpentyl)-2-methylpropanoate, and
    0.01 to 2% by weight of a copolymer represented by Formula 1 below:

[Formula 1]

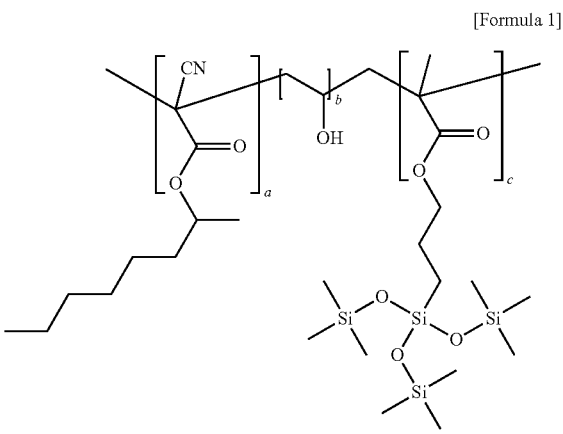

wherein a, b and c represent mole fractions; and
the a is 0.1 to 0.4, b is 0.1 to 0.4, c is 0.3 to 0.7, and a+b+c is 1,
wherein the copolymer of Formula 1 is a random copolymer, and has a weight average molecular weight of 150,000 to 300,000.

* * * * *